United States Patent
Liu

(10) Patent No.: US 11,958,566 B1
(45) Date of Patent: Apr. 16, 2024

(54) CONTROL DEVICE OF INTERNAL SPEED CHANGE DEVICE OF WHEEL HUB FOR CLUTCHING OPERATION

(71) Applicant: Jen-Chih Liu, Taipei (TW)

(72) Inventor: Jen-Chih Liu, Taipei (TW)

(73) Assignee: NEW KAILUNG GEAR CO., LTD., Kaohsiung (TW)

( * ) Notice: Subject to any disclaimer, the term of this patent is extended or adjusted under 35 U.S.C. 154(b) by 0 days.

(21) Appl. No.: 18/047,283

(22) Filed: Oct. 18, 2022

(51) Int. Cl.
*B62M 25/08* (2006.01)
*B62M 11/16* (2006.01)
*F16D 23/06* (2006.01)

(52) U.S. Cl.
CPC ............ *B62M 25/08* (2013.01); *B62M 11/16* (2013.01); *F16D 23/0612* (2013.01); *F16D 2023/0687* (2013.01)

(58) Field of Classification Search
CPC .. F16D 27/01; F16D 23/12; F16D 2023/0687; B62M 11/00–11/18; B62M 25/02
See application file for complete search history.

(56) References Cited

U.S. PATENT DOCUMENTS

| | | | | |
|---|---|---|---|---|
| 5,855,530 A | * | 1/1999 | Huang | B62M 11/18 |
| | | | | 475/341 |
| 2005/0285461 A1 | * | 12/2005 | Kitamura | H02K 1/145 |
| | | | | 310/67 R |
| 2013/0334000 A1 | * | 12/2013 | Gerauer | F16D 27/108 |
| | | | | 192/69.7 |

FOREIGN PATENT DOCUMENTS

DE    102015015238 A1 *  6/2016

* cited by examiner

*Primary Examiner* — Ernesto A Suarez
*Assistant Examiner* — Lillian T Nguyen

(57) ABSTRACT

A control device of an internal speed change device of a wheel hub for clutching operation includes a rod; a lever installed on the rod; the lever being connected to a controlling claw sliding block; an electric sliding block installed on a lever sleeve; the lever sleeve serving to receive a back end of the lever; an electric bushing located at an outer side of the lever sleeve; a controlling ring located at an outer side of the electric bushing; and wherein force of attraction or repulsion between the controlling ring and the electric sliding block drives the electric sliding block to rotate or move axially so as to drive the lever to move forwards or backwards axially; and moving of the lever drives the controlling claw sliding block to control clutching of the internal speed change device.

6 Claims, 8 Drawing Sheets

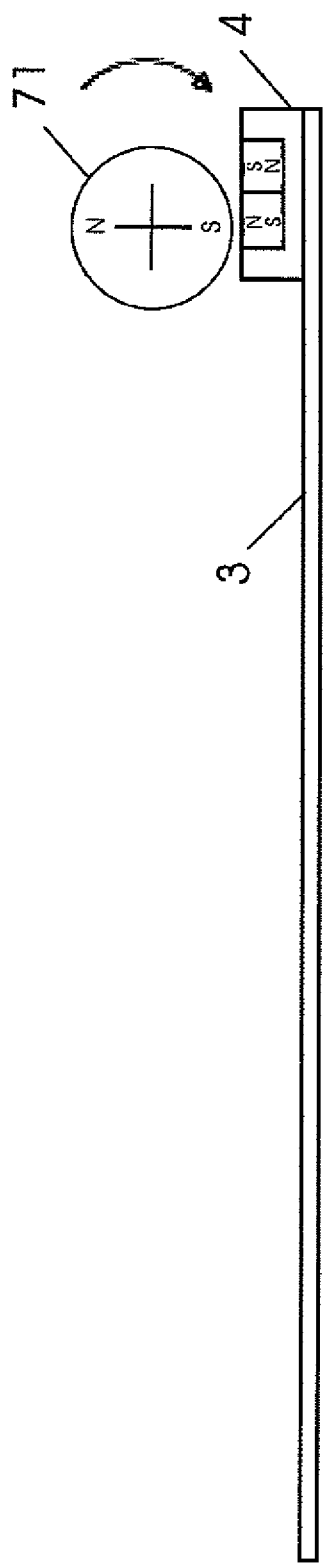
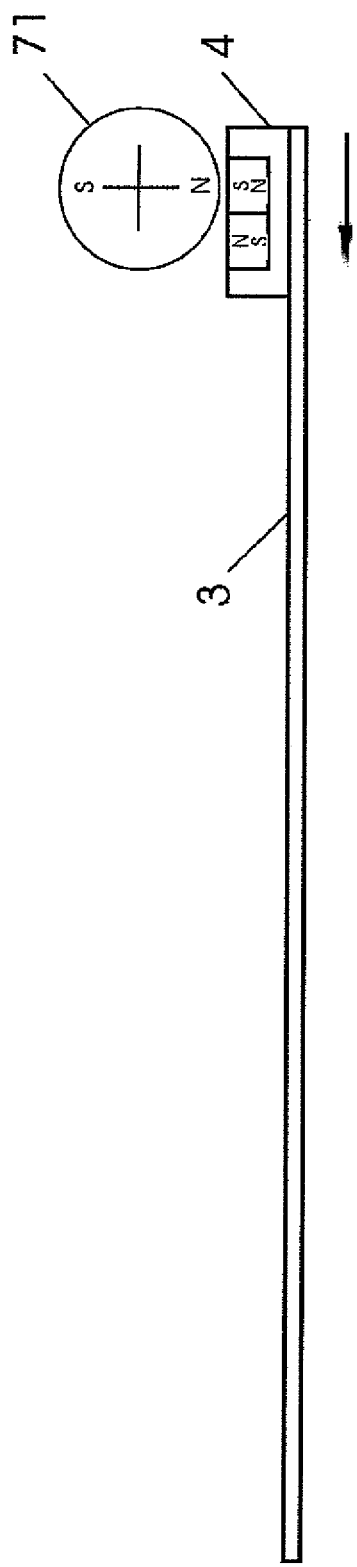

CONTROL DEVICE OF INTERNAL SPEED CHANGE DEVICE OF WHEEL HUB FOR CLUTCHING OPERATION

FIELD OF THE INVENTION

The present invention is related to bicycles, and in particular to a control device of an internal speed change device of a wheel hub for clutching operation.

BACKGROUND OF THE INVENTION

In prior art, speed change devices of bicycle includes exposed speed change device and internal speed change device hidden in wheel hub. Controlling of the speed change device is executed by manual way or electric way.

In the known technology of current electric speed change device, related industries invest hard works in the field of electrical controlling of speed change device to develop an ideal product with high industrial utilization and economic benefits.

Prior speed change device has electrical controlling function, while these prior arts has disadvantages of complex structure, large amount of components, high costs, heavy volume and weights. Therefore these prior arts are not an ideal solution to satisfy the requirement of high industrial utilization and economic benefits.

As a result, there is an eager demand to have a novel structure with simple structure, less components, low costs, light weights, high industrial utilization and economic benefits.

SUMMARY OF THE INVENTION

Accordingly, the object of the present invention is to provide a control device of an internal speed change device of a wheel hub for clutching operation, wherein advantages of the present invention are that the present invention provides a control device of an internal speed change device of a wheel hub for clutching operation, which controls the moving of the lever by force of attraction or repulsion. The control device of the present invention also provides a simple structure, less components, low costs, light weights and high practicability. The present invention also has high safety, practicability, industrial utilization and economic benefits.

To achieve above object, the present invention provides a control device of an internal speed change device of a wheel hub for clutching operation comprising: a rod; a lever installed on the rod; the lever being connected to a controlling claw sliding block; the rod having a guiding groove which extends along a direction of a center axis of the rod; the lever being installed in the guiding groove of the rod and being capable of moving forwards or backwards axially; an electric sliding block installed on a lever sleeve; the lever sleeve serving to receive a back end of the lever; at least one guiding notch formed at an inner side of the lever sleeve; the back end of the lever extending into one of the at least one guiding notch; the back end of the lever forming a teethed strip; at least one installing hole formed on the lever sleeve and the installing hole connecting the respective guiding notch; the electric sliding block being installed in one of the at least one installing hole; the electric sliding block having a teethed surface engaged to the teethed strip of the lever; the electric sliding block being installed with a second magnetic unit; an electric bushing located at an outer side of the lever sleeve; a controlling ring located at an outer side of the electric bushing; an inner side of the controlling ring being installed with a first magnetic unit; an outer side of the controlling ring is installed with a gear; and wherein the electric sliding block is rotatable; when the gear is driven to rotate by an external force, the controlling ring rotates synchronously; force of attraction or repulsion between the first magnetic unit of the controlling ring and the second magnetic unit of the electric sliding block drives the electric sliding block to rotate so as to drive the lever to move forwards or backwards axially; and moving of the lever drives the controlling claw sliding block to control clutching of the internal speed change device.

The present invention further provides a control device of an internal speed change device of a wheel hub for clutching operation comprising: a rod; a lever installed on the rod; the lever being connected to a controlling claw sliding block; the rod having a guiding groove which extends along a direction of a center axis of the rod; the lever being installed in the guiding groove of the rod and being capable of moving forwards or backwards axially; an electric sliding block installed on a lever sleeve; the lever sleeve serving to receive a back end of the lever; the back end of the lever connecting to the electric sliding block; a guiding notch formed at an inner side of the lever sleeve; the back end of the lever extending into one of the at least one guiding notch; at least one installing hole formed on the lever sleeve and the installing hole connecting the respective guiding notch; and the electric sliding block being fixed on the back end of the lever and being located in the guiding notch and one of the at least one installing hole; the electric sliding block being installed with a second magnetic unit; an electric bushing located at an outer side of the lever sleeve; a controlling ring located at an outer side of the electric bushing; an inner side of the controlling ring being installed with a first magnetic unit; an outer side of the controlling ring being installed with a gear; and wherein the electric sliding block is linear movable; when the gear is driven to rotate by an external force, the controlling ring rotates synchronously; force of attraction or repulsion between the first magnetic unit of the controlling ring and the second magnetic unit of the electric sliding block drives the electric sliding block to move axially so as to drive the lever to move forwards or backwards axially; and moving of the lever drives the controlling claw sliding block to control clutching of the internal speed change device.

BRIEF DESCRIPTION OF THE DRAWINGS

FIG. 11 is a schematic view showing the backward moving of the lever of the fourth embodiment of the present invention.

FIG. 12 is a schematic view showing the forward moving of the lever of the fourth embodiment of the present invention.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

The present invention provides a control device of an internal speed change device of a wheel hub for clutching operation. In application, the control device is installed in the internal speed change device of the wheel hub, which serves to control the clutching of the internal speed change device through axial moving of a lever. The axial moving of the lever is controlled by force of attraction or repulsion of the control device.

Figure 6:
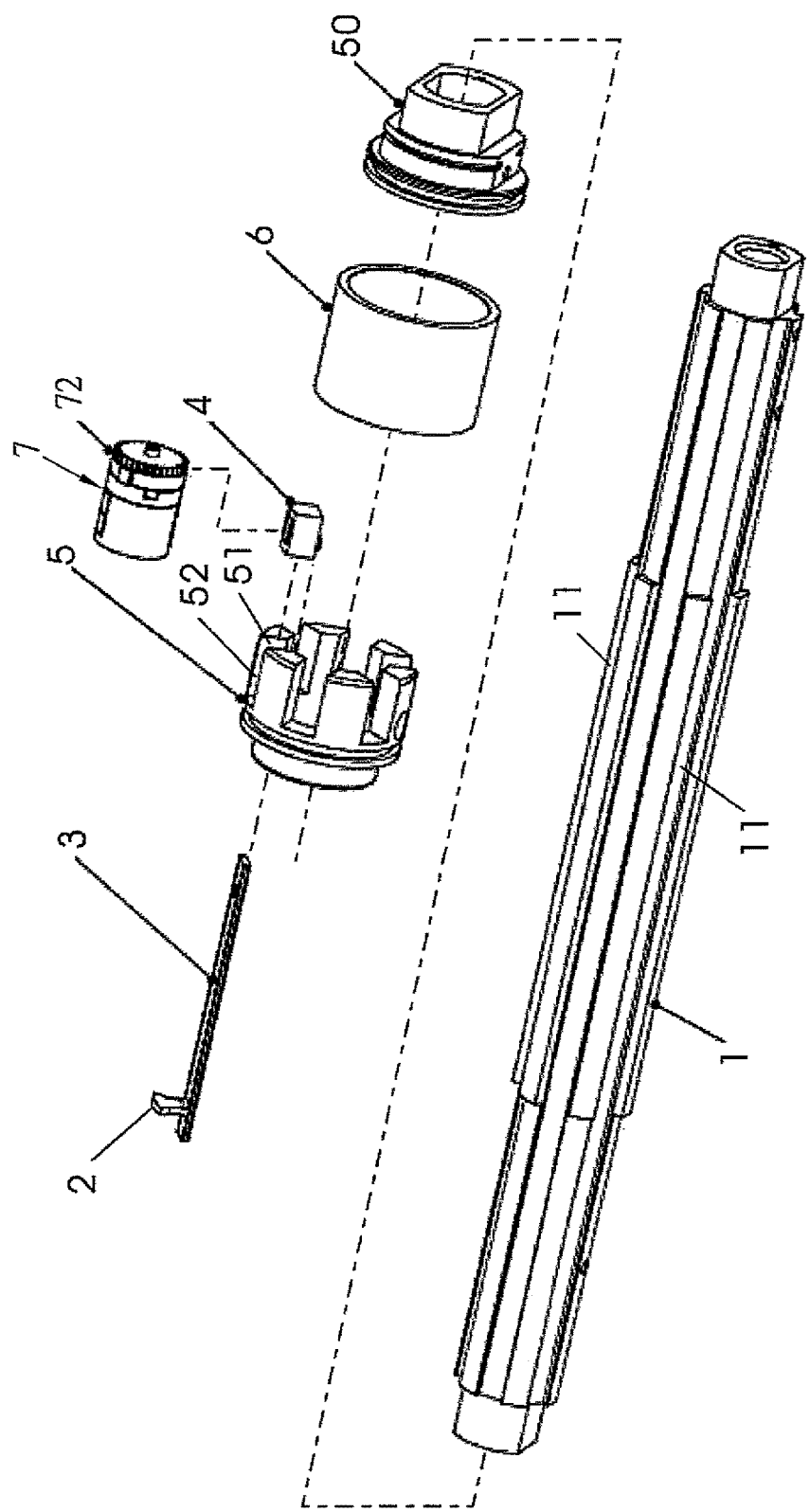
FIG. 6 is an assembly schematic view of the elements of the second to fourth embodiment of the present invention.
Figure 7:
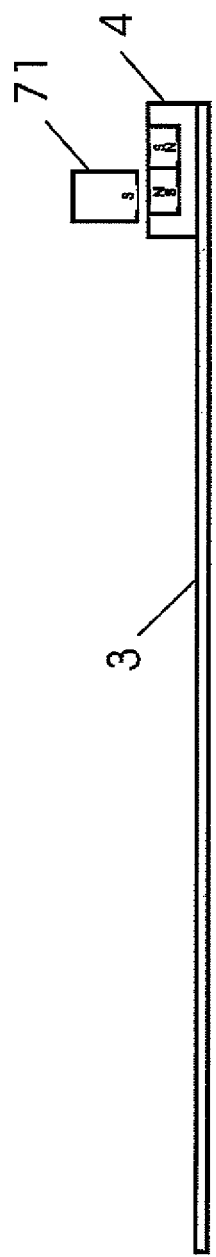
FIG. 7 is a schematic view showing the backward moving of the lever of the second embodiment of the present invention.
Figure 8:
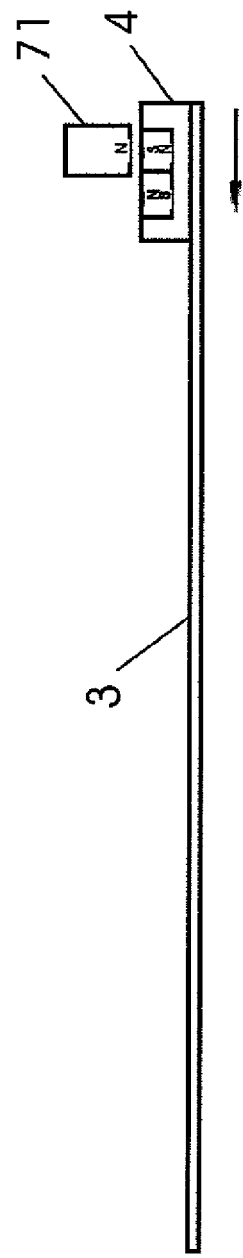
FIG. 8 is a schematic view showing the forward moving of the lever of the second embodiment of the present invention.
Figure 9:
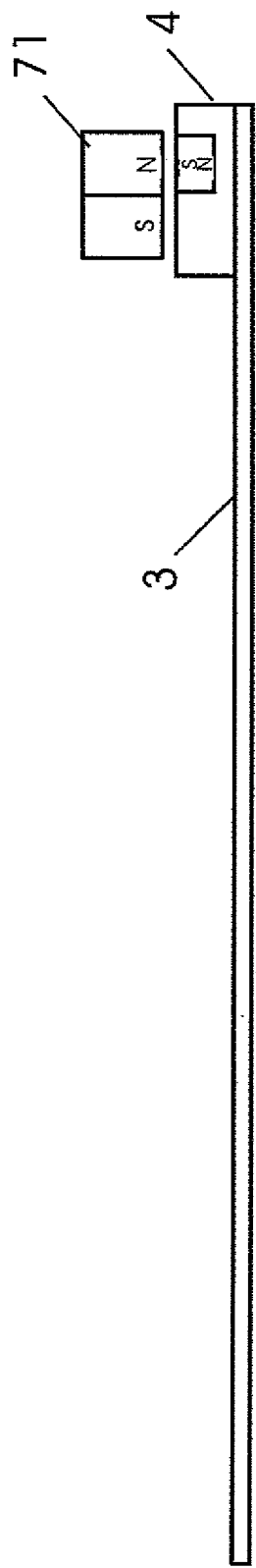
FIG. 9 is a schematic view showing the backward moving of the lever of the third embodiment of the present invention.
Figure 10:
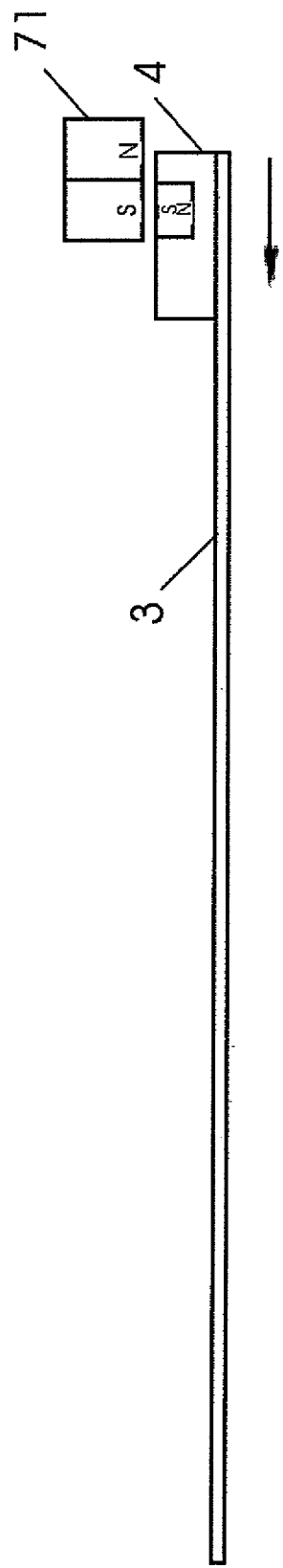
FIG. 10 is a schematic view showing the forward moving of the lever of the third embodiment of the present invention.

With reference to FIGS. 1 to 5, the structure of the first embodiment of the present invention is illustrated. FIGS. 7 to 8 show the second embodiment of the present invention. FIGS. 9 to 10 show the third embodiment of the present invention. FIGS. 11 to 12 show the fourth embodiment of the present invention. FIG. 6 shows an assembly schematic view of the elements of the second to fourth embodiment of the present invention. All embodiments use common features to achieve special effects. The present invention comprises a rod 1, a controlling claw sliding block 2, a lever 3, an electric sliding block 4, a lever sleeve 5, an electric bushing 6 and a controlling ring 7. The lever 3 is installed on the rod 1. The lever 3 is connected to a controlling claw sliding block 2. The electric sliding block 4 is installed on a lever sleeve 5. The lever sleeve 5 serves to receive a back end of the lever 3. The back end of the lever 3 connects to the electric sliding block 4. The electric bushing 6 is located at an outer side of the lever sleeve 5. The controlling ring 7 is located at an outer side of the electric bushing 6. Force of attraction or repulsion between the controlling ring 7 and the electric sliding block 4 drives the electric sliding block 4 to rotate or move axially so as to drive the lever 3 to move axially. Moving of the lever 3 drives the controlling claw sliding block 2 to control the clutching of an internal speed change device.

Figure 1:
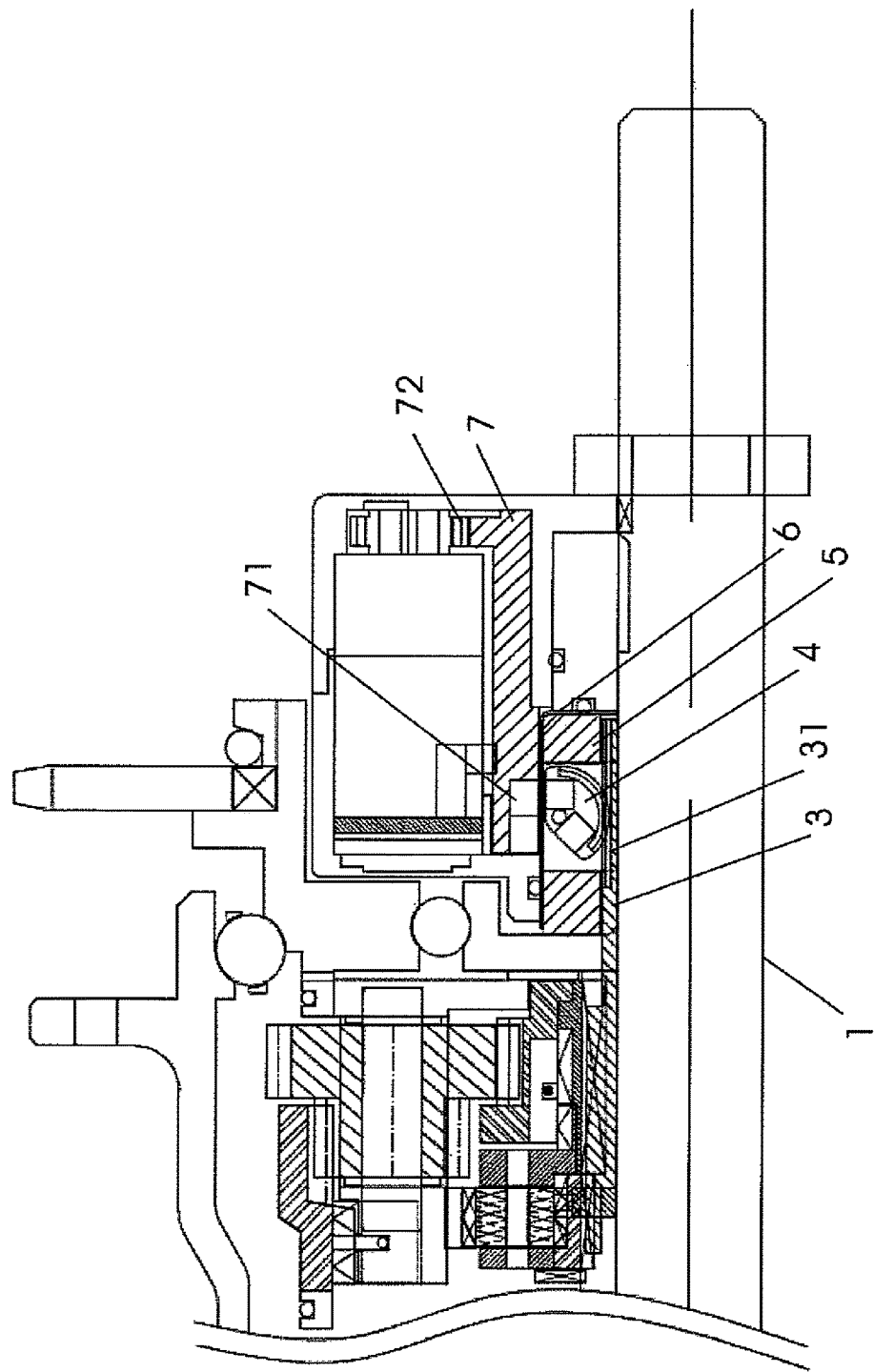
FIG. 1 is a cross sectional view showing the assembly of elements of the first embodiment of the present invention and an internal speed change device of a wheel hub.
Figure 2:
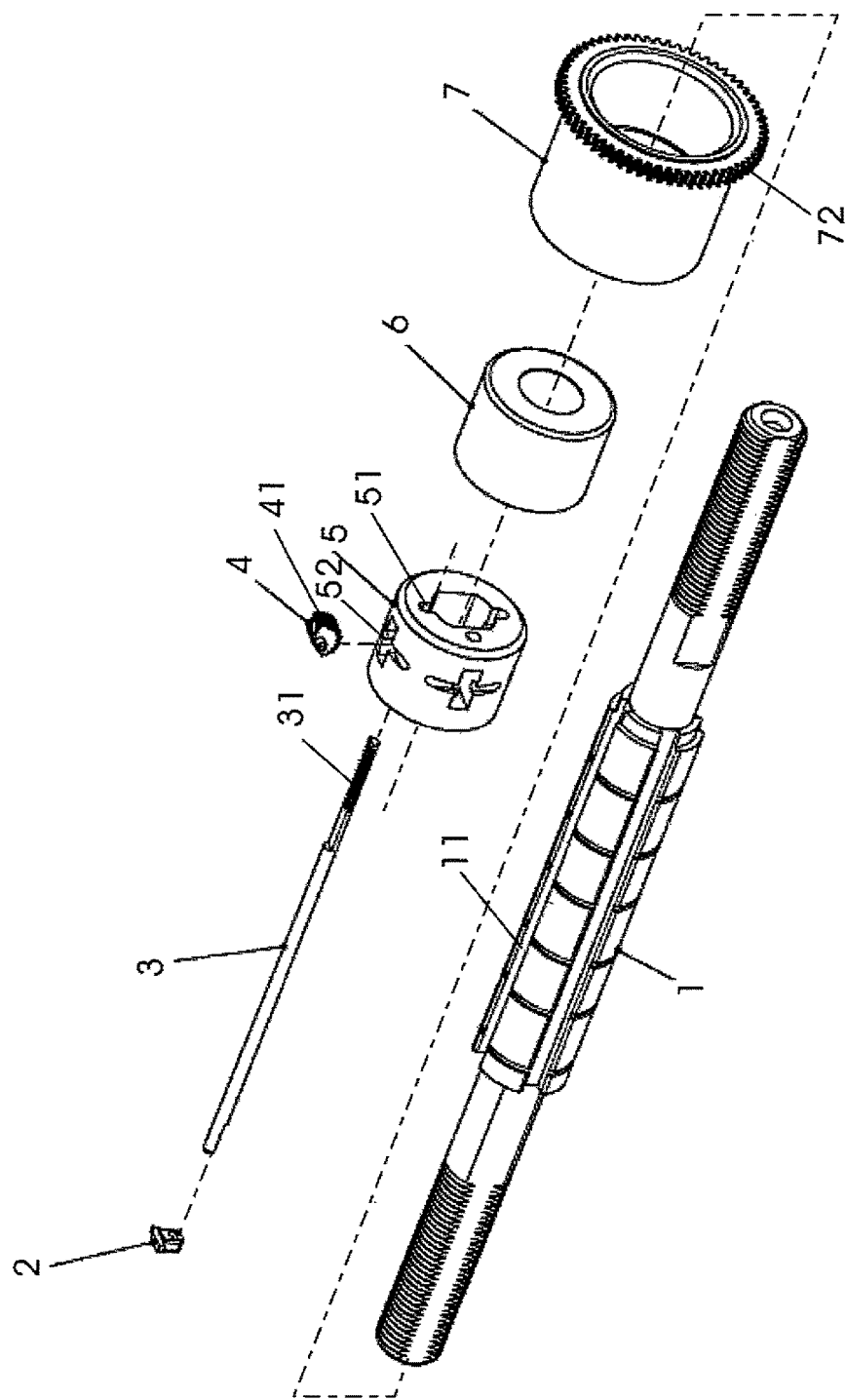
FIG. 2 is an assembly schematic view of the elements of the first embodiment of the present invention.
Figure 3:
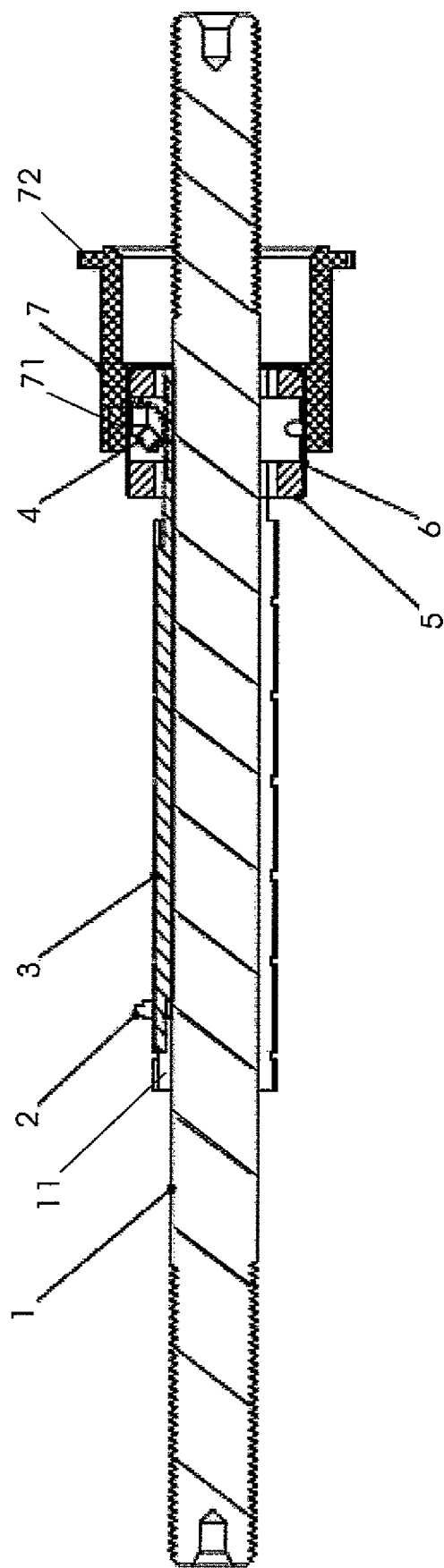
FIG. 3 is a cross sectional view showing the assembly of elements of the first embodiment of the present invention.

Referring to FIGS. 1 to 5, it shows the first embodiment of the present invention, wherein the electric sliding block 4 is rotatable by a swinging way. The rod 1 has a guiding groove 11 which extends along a direction of a center axis of the rod 1. The lever 3 is installed in the guiding groove 11 of the rod 1. The controlling claw sliding block 2 extends from a front end of the lever 3. A back end of the lever 3 forms teethed strip 31. At least one guiding notch 51 is formed at an inner side of the lever sleeve 5. The back end of the lever 3 extends into one of the at least one guiding notch 51. At least one installing hole 52 is formed on the lever sleeve 5 and the installing hole 52 connects the respective guiding notch 51. The electric sliding block 4 is engaged to the teethed strip 31 of the lever 3. The electric sliding block 4 is installed in one of the at least one installing hole 52. Referring to FIG. 3, the electric sliding block 4 has a teethed surface 41 engaged to the teethed strip 31 of the lever 3. The electric sliding block 4 is installed with a second magnetic unit 42 which has an S pole and an N pole. The second magnetic unit 42 is a permanent magnet.

The controlling ring 7 surrounds an outer side of the lever sleeve 5. The electric bushing 6 surrounds the outer side of the lever sleeve 5. The controlling ring 7 surrounds an outer side of the electric bushing 6. The controlling ring 7 is rotatable. The rod 1 pass through the lever sleeve 5. An inner side of the controlling ring 7 is installed with a first magnetic unit 71 which has an S pole and an N pole. The first magnetic unit 71 is a permanent magnet or an electromagnet. An outer side of the controlling ring 7 is installed with a gear 72. When the gear 72 is driven to rotate with a predetermined angle by an external force, the controlling ring 7 rotates synchronously with the predetermined angle. When the controlling ring 7 rotates to move the S pole or the N pole of the first magnetic unit 71 to a positon locating the electric sliding block 4, a force of attraction or repulsion between the first magnetic unit 71 and the second magnetic unit 42 drives the electric sliding block 4 to move so that the N pole or the S pole of the second magnetic unit 42 attracts a respective one of the S pole and the N pole of the first magnetic unit 71.

Figure 4:
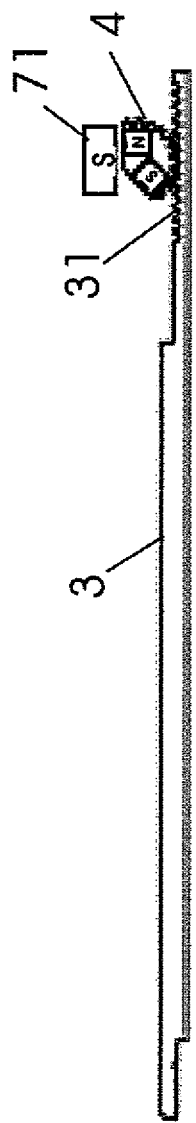
FIG. 4 is a schematic view showing the backward moving of the lever of the first embodiment of the present invention.

FIG. 4 shows the first embodiment of the present invention. When the controlling ring 7 rotates with the predetermined angle to rotate the S pole of the first magnetic unit 71 to a position locating the second magnetic unit 42 of the electric sliding block 4, the electric sliding block 4 is driven to rotate counterclockwise by a force of attraction or repulsion between the S pole of the first magnetic unit 71 and the second magnetic unit 42 so as to drive the lever 3 to move backwards horizontally along an axial direction by the teethed surface 41 of the electric sliding block 4.

Figure 5:
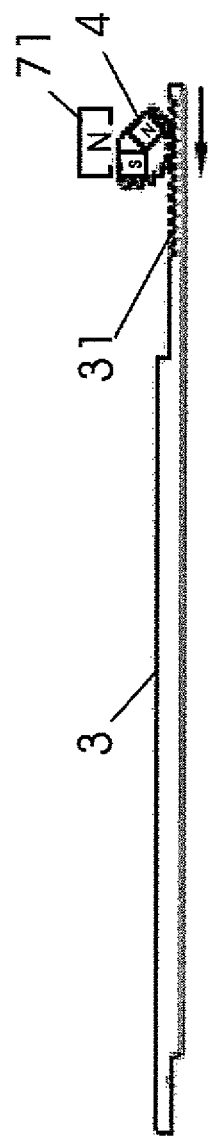
FIG. 5 is a schematic view showing the forward moving of the lever of the first embodiment of the present invention.

Referring to FIG. 5, when the controlling ring 7 rotates successively with the predetermined angle to rotate the N pole of the first magnetic unit 71 to a position locating the second magnetic unit 42 of the electric sliding block 4, the electric sliding block 4 is driven to rotate clockwise by a force of attraction or repulsion between the N pole of the first magnetic unit 71 and the second magnetic unit 42 so as to drive the lever 3 to move forwards horizontally along an axial direction by the teethed surface 41 of the electric sliding block 4.

Referring to FIGS. 6, 7 and 8, it shows the second embodiment of the present invention, wherein the electric sliding block 4 is linear movable. In this embodiment, those elements identical to those in the first embodiment are illustrated by the same numerals and they have the same functions and effects. Therefore, the details will not be further described herein. Only the difference therebetween are described herein.

The second embodiment has a linear driving structure, wherein the controlling ring 7 has a unipolar magnetic structure and the electric sliding block 4 has a bipolar magnetic structure.

The lever 3 is installed on the rod 1. The lever 3 is connected to a controlling claw sliding block 2. The electric sliding block 4 is installed on a lever sleeve 5. The lever sleeve 5 serves to receive a back end of the lever 3. The back end of the lever 3 connects to the electric sliding block 4. The electric bushing 6 is located at an outer side of the lever sleeve 5. The controlling ring 7 is located at an outer side of the electric bushing 6. Force of attraction or repulsion between the controlling ring 7 and the electric sliding block 4 drives the electric sliding block 4 to move axially to drive the lever 3 move axially. Moving of the lever 3 drives the controlling claw sliding block 2 to control the clutching of an internal speed change device.

Referring to FIG. 7, the rod 1 has a guiding groove 11 which extends along a direction of a center axis of the rod 1. The lever 3 is installed in the guiding groove 11 of the rod 1. The controlling claw sliding block 2 extends from a front end of the lever 3. At least one guiding notch 51 formed at an inner side of the lever sleeve 5. The back end of the lever 3 extends into one of the at least one guiding notch 51. At least one installing hole 52 is formed on the lever sleeve 5 and the installing hole 52 connects the respective guiding notch 51. In the second embodiment, the electric sliding block 4 is fixed on the back end of the lever 3 and is located in the guiding notch 51 and one of the at least one installing hole 52. An outer side of the at least one installing hole 52 is closed by a sleeve cover 50.

When the controlling ring 7 rotates with the predetermined angle to rotate the S pole of the first magnetic unit 71 to a position locating the second magnetic unit 42 of the electric sliding block 4, the electric sliding block 4 is driven to move backwards by a force of attraction or repulsion between the S pole of the first magnetic unit 71 and the second magnetic unit 42 so as to drive the lever 3 to move backwards horizontally along an axial direction.

Referring to FIG. 8, when the controlling ring 7 rotates successively with the predetermined angle to rotate the N pole of the first magnetic unit 71 to a position locating the second magnetic unit 42 of the electric sliding block 4, the electric sliding block 4 is driven to move forwards by a force of attraction or repulsion between the N pole of the first magnetic unit 71 and the second magnetic unit 42 so as to drive the lever 3 to move forwards horizontally along an axial direction.

Referring to FIGS. 6, 9 and 10, it shows the third embodiment of the present invention, wherein the electric sliding block 4 is linear movable. In this embodiment, those elements identical to those in the first embodiment are illustrated by the same numerals and they have the same functions and effects. Therefore, the details will not be further described herein. Only the difference therebetween are described herein.

The third embodiment has a linear driving structure, wherein the controlling ring 7 has a bipolar magnetic structure and the electric sliding block 4 has a unipolar magnetic structure.

In this embodiment, when the controlling ring 7 rotates with the predetermined angle to rotate the N pole or the S pole of the first magnetic unit 71 to a position locating the second magnetic unit 42 of the electric sliding block 4, the electric sliding block 4 is driven to move forwards or backwards by a force of attraction or repulsion between the first magnetic unit 71 and the second magnetic unit 42 so as to drive the lever 3 to move forwards or backwards horizontally along an axial direction.

Referring to FIGS. 6, 11 and 12, it shows the fourth embodiment of the present invention, wherein the electric sliding block 4 is linear movable. In this embodiment, those elements identical to those in the first embodiment are illustrated by the same numerals and they have the same functions and effects. Therefore, the details will not be further described herein. Only the difference therebetween are described herein.

The fourth embodiment has a linear driving structure, wherein the controlling ring 7 has a bipolar magnetic structure and the electric sliding block 4 has a bipolar magnetic structure.

In this embodiment, when the controlling ring 7 rotates with the predetermined angle to rotate the N pole or the S pole of the first magnetic unit 71 to a position locating the second magnetic unit 42 of the electric sliding block 4, the electric sliding block 4 is driven to move forwards or backwards by a force of attraction or repulsion between the first magnetic unit 71 and the second magnetic unit 42 so as to drive the lever 3 to move forwards or backwards horizontally along an axial direction.

Therefore, in the first to fourth embodiments of the present invention, the axial moving of the lever 3 is caused by rotation or axial moving of the electric sliding block 4 which is driven by force of attraction or repulsion between the controlling ring 7 and the electric sliding block 4. As a result, the lever 3 is driven to move forwards or backwards horizontally along an axial direction so as to drive the controlling claw sliding block 2 to control the clutching of an internal speed change device.

Advantages of the present invention are that the present invention provides a control device of an internal speed change device of a wheel hub for clutching operation, which controls the moving of the lever by force of attraction or repulsion. The control device of the present invention also provides a simple structure, less components, low costs, light weights and high practicability. The present invention also has high safety, practicability, industrial utilization and economic benefits.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A control device of an internal speed change device of a wheel hub for clutching operation comprising:
   a rod (1);
   a lever (3) installed on the rod (1); the lever (3) being connected to a controlling claw sliding block (2); the rod (1) having a guiding groove (11) which extends along a direction of a center axis of the rod (1); the lever (3) being installed in the guiding groove (11) of the rod (1) and being capable of moving forwards or backwards axially;
   an electric sliding block (4) installed on a lever sleeve (5); the lever sleeve (5) serving to receive a back end of the lever (3); at least one guiding notch (51) formed at an inner side of the lever sleeve (5); the back end of the lever (3) extending into one of the at least one guiding notch (51); the back end of the lever (3) forming a teethed strip (31); at least one installing hole (52) formed on the lever sleeve (5) and the installing hole (52) connecting the respective guiding notch (51); the electric sliding block (4) being installed in one of the at least one installing hole (52); the electric sliding block (4) having a teethed surface (41) engaged to the teethed strip (31) of the lever (3); the electric sliding block (4) being installed with a second magnetic unit (42);
   an electric bushing (6) located at an outer side of the lever sleeve (5);
   a controlling ring (7) located at an outer side of the electric bushing (6); an inner side of the controlling ring (7) being installed with a first magnetic unit (71); an outer side of the controlling ring (7) is installed with a gear (72); and wherein the electric sliding block (4) is rotatable; when the gear (72) is driven to rotate by an external force, the controlling ring (7) rotates synchronously; force of attraction or repulsion between the first magnetic unit (71) of the controlling ring (7) and the second magnetic unit (42) of the electric sliding block (4) drives the electric sliding block (4) to rotate so as to drive the lever (3) to move forwards or backwards axially; and moving of the lever (3) drives the controlling claw sliding block (2) to control clutching of the internal speed change device.

2. The control device of the internal speed change device of the wheel hub for clutching operation as claimed in claim 1, wherein the controlling claw sliding block (2) extends from a front end of the lever (3).

3. The control device of the internal speed change device of the wheel hub for clutching operation as claimed in claim 1, wherein the second magnetic unit (42) is a permanent magnet which has an S pole and an N pole.

4. The control device of the internal speed change device of the wheel hub for clutching operation as claimed in claim 1, wherein the first magnetic unit (71) is a permanent magnet or an electromagnet which has an S pole and an N pole.

5. The control device of the internal speed change device of the wheel hub for clutching operation as claimed in claim 4, wherein when the controlling ring (7) rotates with a predetermined angle to rotate the S pole of the first magnetic unit (71) to a position locating the second magnetic unit (42) of the electric sliding block (4), the electric sliding block (4) is driven to rotate counterclockwise by a magnetic force between the S pole of the first magnetic unit (71) and the second magnetic unit (42) so as to drive the lever (3) to move backwards along an axial direction by the teethed surface (41) of the electric sliding block (4); and wherein when the controlling ring (7) rotates continuously with the predetermined angle to rotate the N pole of the first magnetic unit (71) to a position locating the second magnetic unit 42 of the electric sliding block (4), the electric sliding block (4) is driven to rotate clockwise by a force of attraction or repulsion between the N pole of the first magnetic unit (71) and the second magnetic unit (42) so as to drive the lever (3) to move forwards along the axial direction by the teethed surface (41) of the electric sliding block (4).

6. The control device of the internal speed change device of the wheel hub for clutching operation as claimed in claim 1, wherein the electric bushing (6) surrounds the outer side of the lever sleeve (5); and the controlling ring (7) surrounds the outer side of the electric bushing (6).

* * * * *